United States Patent [19]

Sheiman et al.

[11] 4,321,727
[45] Mar. 30, 1982

[54] LUGGAGE ROLLER

[76] Inventors: Samuel R. Sheiman; Julius Sheiman, both of c/o Crest Lock Co., Inc., 247 Centre St., New York, N.Y. 10013

[21] Appl. No.: 167,795

[22] Filed: Jul. 14, 1980

Related U.S. Application Data

[63] Continuation-in-part of Ser. No. 21,449, Mar. 17, 1979, abandoned.

[51] Int. Cl.³ .................. B60B 33/00; A47B 91/00; A43C 5/00
[52] U.S. Cl. ........................ 16/18 R; 16/45; 190/18 A
[58] Field of Search .................. 16/45, 46, 47; 190/18 A; 16/18 R

[56] References Cited

U.S. PATENT DOCUMENTS 3,163,268 12/1964 Leavell .................. 190/18 A
3,899,801 8/1975 Carrier .................. 16/45

Primary Examiner—Doris L. Troutman
Attorney, Agent, or Firm—Kirschstein, Kirschstein, Ottinger & Cobrin

[57] ABSTRACT

A luggage roller featuring a diabolo-shaped wheel, which is preferably detachable from the piece of luggage, i.e. a container, to which it is mounted. The diabolo-shaped wheel is more stable than prior art configurations, because of its greater effective width leading to greater bearing area. The detachable feature of the wheel leads to changeability of the luggage roller wheel when wear occurs, so that the piece of luggage does not have to be discarded when the installed wheel wears down. This detachable feature is typically attained by providing an axle on which the wheel is mounted which is detachable from the container. The axle is generally of one of several alternative configurations in which a threaded connection is provided between portions of the axle assemblage, so that one portion of part of the axle assemblage may be unscrewed from the other portion or part.

6 Claims, 8 Drawing Figures

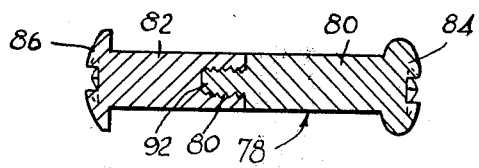
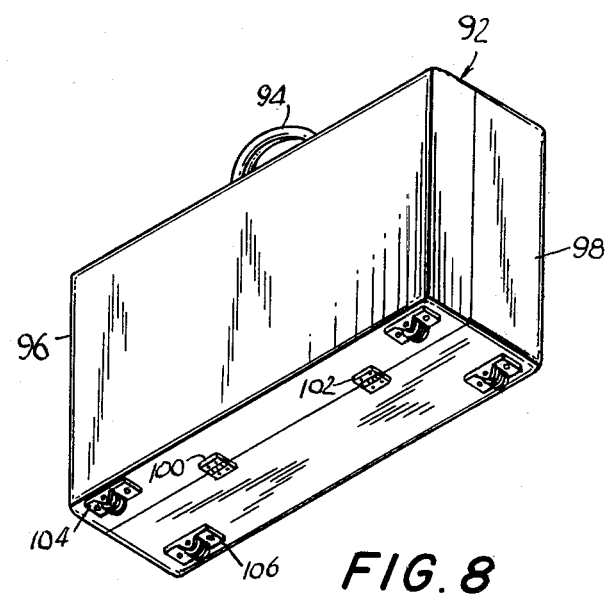
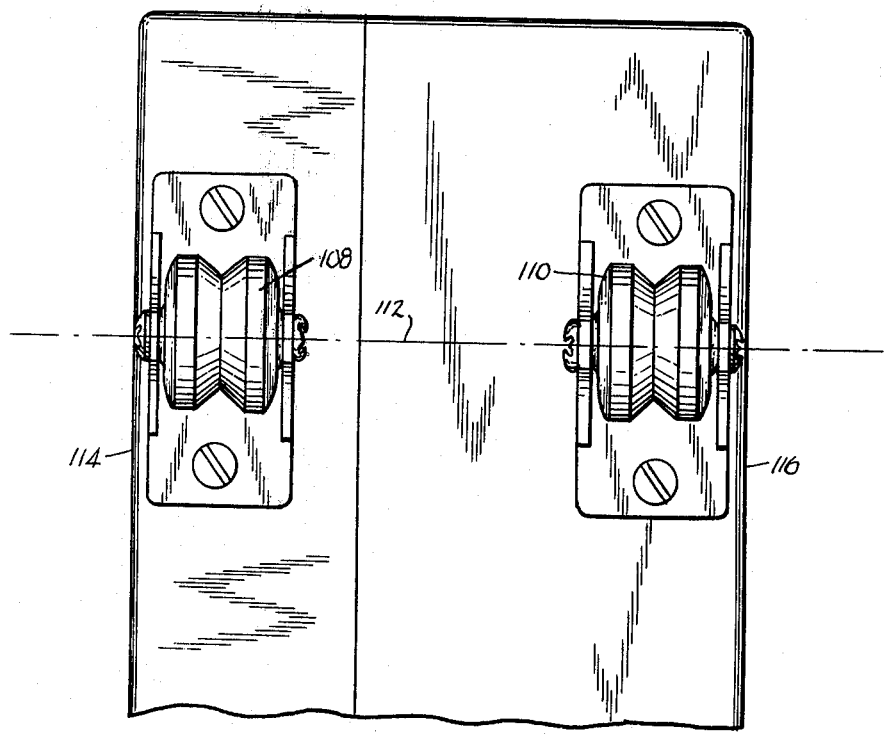

LUGGAGE ROLLER

CROSS REFERENCE TO RELATED APPLICATIONS

This application is a continuation-in-part of a copending application for Luggage Roller Ser. No. 21,449, filed Mar. 17, 1979 now abandoned.

BACKGROUND OF THE INVENTION

1. Field of the Invention
A luggage roller.

2. Description of the Prior Art

In recent years it has been the practice to provide luggage, particularly large pieces of luggage which when loaded are quite heavy, with several rollers on their bottoms, e.g. two pairs or three pairs of rollers, whereby to enable a person to roll the luggage over flat surfaces without strain. Sometimes these rollers had fixed axes of rotation and in such event that axes of rotation were parallel to the bottom of the luggage and perpendicular to the length of the luggage. The axes of rotation of any pair of rollers conventionally were in registry. The rollers were ordinarily located near the sides of the luggage to obtain a large spacing between them. This was done because a loaded piece of luggage had a high center of gravity and tended to become unstable when tipped, or when subjected to a lateral force. By increasing the spaces between the rollers of a pair of rollers, stability was improved. It also has been proposed to provide the sundry rollers with swivel connections to the luggage, so that the direction of travel of luggage could be more easily altered.

Standard rollers, and by this reference is directed to the wheels as distinguished from the rotational mounting for the wheels, ordinarily have been provided with a cross section such that the roller has a laterally curved surface where it engaged the ground. It is believed that this was done in an effort to minimize friction between the wheel and the ground and this required less effort to pull or push the luggage; however because of this curved ground engaging surface, the distance between the points of contacts of two rollers of a pair of rollers was less than it effectively could be, so that the stability of the luggage using such wheels was somewhat low. It will be appreciated that a standard piece of luggage is not particularly wide; a specific width might be somewhere between 8 inches and 12 inches. A typical width between each wheel of a pair of roller wheels is about 6 inches from outside to outside; the actual spacing between the points of contact is only 5½ inches so that if the center of gravity of a loaded piece of luggage is displaced by approximately 2 inches and ¾ inches, the luggage will fall on its side. It would be highly advantageous if this effective spacing bewteen the extreme points of contact of the wheels and the ground could be increased.

Frequently debris, e.g. small pieces of wood or dirt or pebbles, will enter into the space between the wheel and a stationary part adjacent the wheel, for example a bracket that supports the wheel. This will prevent the wheel from rotating freely so that the wheel becomes fixed. With a jammed wheel the luggage becomes much more difficult to push or pull; in addition when a wheel jams and slides on the ground rather than rolls, the wheel becomes flat so that subsequently even if it is freed, it no longer will roll properly since the flat intermittently hits the ground.

Other times a wheel becomes damaged in a different fashion. For example, a wheel may split, or a journal for the wheel may become worn out. When a wheel becomes defective for any reason, it substantially destroys the piece of luggage for the person owning it. The roll-about feature is totally lost. The person has the choice of using the luggage without the roll-about feature, or fixing a wheel. In most cases since the mounting for the wheel, e.g. the bracket, is permanently connected to the piece of luggage, the replacement of the wheel is a major problem. A person must send the piece back to the manufacturer or to a special repair shop. More recently, it has been proposed to mount roller brackets on a plate which is detachably secured to a plate permanently fixed to the bottom of a piece of luggage. The theory is that a person of little skill can separate the two plates and buy a replacement plate with the wheel attached and substitute it for the plate having the defective wheel. However this practice has not been accepted by the public at large. They have purchased luggage with such detachable wheel brackets since it is a good sales feature while it is still in the store, but they have not taken advantage of this in everyday use. It would be highly desirable to provide a wheel which is replaceable with much greater ease than the structure utilizing detachable connecting plates. There is another problem which has plagued the roll-about luggage industry, namely that such luggage is difficult to roll about on floors covered with high pile carpeting including shag rugs. It would be desirable to provide a configuration of luggage wheel which is not susceptible to this drawback and which at the same time would provide greater stability and the ability to shed debris.

SUMMARY OF THE INVENTION

1. Purposes of the Invention

It is an object of the present invention to provide an improved luggage roller.

Another object is to provide a luggage roller having an improved shape of roller wheel.

A further object is to provide a luggage roller for a piece of luggage which renders the piece of luggage more stable when manipulated and moved across a planar surface.

An additional object is to provide a luggage roller which enables the piece of luggage to be more easily moved across the surface of a shag rug.

Still another object is to provide a luggage roller in which the wheel of the roller has greater effective width area than prior art wheels.

Still a further object is to provide a luggage roller with a diabolo-shaped wheel.

Still an additional object is to provide a luggage roller with a detachable wheel.

An object is to extend the useful life of a piece of luggage by providing a luggage roller in which the wheel is detachable and replaceable when worn.

An object is to provide a luggage roller with a wheel having greater effective width than prior art wheels.

These and other objects and advantages of the present invention will become evident from the description which follows.

2. Brief Description of the Invention

Within the context of the present invention, it will be understood that the term "container" encompasses and includes various types and pieces of luggage.

In the principal embodiment of the invention, the luggage roller includes and features a diabolo-shaped wheel. As commonly understood, a diabolo is a game in which an hourglass-shaped top is balanced and spun on a string stretched between the tips of two sticks; however the term "diabolo" also refers to the top used in this game. As will appear infra, the diabolo shape will be described and shown in the drawings.

With specific regard to the present luggage roller having a diabolo-shaped wheel, the luggage roller also includes an axle, means mounting the wheel to the axle for rotation about the longitudinal axis of the axle, and means for mounting the axle to a container, such that the container may be transported across a horizontal surface, by disposing the container on the planar surface with the wheel in contact with the planar surface and at least partially supporting the container.

In a preferred embodiment, each lateral outer edge of the wheel has a chamfer, to accommodate movement of the container across a planar surface is a curved path, or slight tilting of the container, and also to roll more easily on a shag rug by presenting narrow edges to the rug. Typically the wheel is freely and slidably mounted to the axle, so that the wheel is freely rotatable about a fixed axle. A cylindrical sleeve composed of a wear-resistant material such as Teflon or other plastic material, brass, or steel is concentrically interposed between the wheel and the axle in order to reduce rolling friction, minimize wear in service and also to provide greater strength to the wheel. The sleeve is secured to the central bore of the wheel as a mold insert.

One aspect and facet of the present invention entails providing a configuration in which an axle and a wheel of diabolo shape are detachably mounted to the support bracket. Each of the ends of the axle is mounted to one of a pair of opposed parallel bracket legs, and means is provided so that the bracket legs can be mounted to the luggage. Several alternative configurations for detachably mounting the wheel and axle to the support bracket are feasible. One entails the provision of a slotted head (straight slot or cross Phillips slots) at one end of the axle and external to its associated bracket leg, with the other end of the axle having a threaded recess. A screw having a slotted head (straight slot of Phillips) is screwed into the recess, with the slotted head of the screw being external to the opposed bracket leg associated with the other end of the axle.

Another configuration for detachably mounting the wheel and axle to the support bracket entails the provision of an axle in which one end of the axle has a slotted head external to its associated bracket leg, and the other end of the axle is externally threaded. A nut is screwed onto the other end of the axle, the nut being external to the bracket leg associated with the other end of the axle.

In still another alternative configuration, the axle is a split axle having two opposed portions. The inner end of one portion has a threaded recess, and the inner end of the other portion has a threaded protuberance that is screwed into the recess.

In a preferred embodiment, at least one of the bracket legs is provided with a generally perpendicular extension along a lateral edge, so that a baffling against ingress of discrete material between the wheel and the luggage is provided. Each of the bracket legs is provided with opposed extensions which extend towards each other and terminate at edges which are contiguous.

In one embodiment of the invention, and typically as commercially manufactured, an interposed mounting plate adapted to mount on the luggage is provided, with means mounting opposed edges of the bracket legs to the mounting place.

In a preferred embodiment of the invention, the means for mounting the axle to the luggage is a swivel.

Usually the wheel is composed of rubber or plastic, however wooden or steel wheels are also feasible. The wheel is one of a pair of opposed and spaced apart identical wheels mounted to the luggage. The wheels are transversely registered, and each wheel is mounted adjacent an edge of the bottom of the luggage.

The present improved luggage roller provides several salient advantages. The luggage roller has an improved diabolo-shaped roller wheel. The present luggage roller, because of the configuration of the wheel, renders the piece of luggage more stable when manipulated and moved across a planar surface inasmuch as the diabolo shape makes the wheel wider. The present luggage roller enables the piece of luggage to be more easily moved across the surface of a shag rug because the strands of the shag need not be flattened—they need only be bent for accomodation in the groove of the wheel. The detachable feature of the present wheel is highly advantageous, since the useful life of a piece of luggage is extended by providing a luggage roller in which the wheel is detachable when worn, so that worn wheels on the piece of luggage no longer necessitate discarding the piece of luggage. An entire wheel assembly, including the bracket support, no longer has to be replaced in order to replace the wheel. The axle can be detached with a household screw driver. The present luggage roller is more stable and not as easily tipped over. The present luggage roller is relatively inexpensive and may readily be manufactured in mass production facilities, using unskilled labor. Finally, the present luggage roller is rugged and serviceable and is not easily broken or jammed. This latter consideration is especially important when the piece of luggage is moved over a planar surface having discrete solid particles such as pebbles, twigs or leaves thereon.

The invention accordingly consists in the features of construction, combination of elements and arrangements of parts which will be exemplified in the article of manufacture hereinafter described and of which the scope of application will be indicated in the appended claims.

BRIEF DESCRIPTION OF THE DRAWINGS

In the accompanying drawings in which are shown several of the various possible embodiments of the invention:

FIG. 6 shows an alternative embodiment of axle;

FIG. 7 is a bottom plan view of a typical pair of luggage rollers as installed on a piece of luggage; and FIG. 8 is a bottom perspective view of a piece of luggage with the present luggage rollers installed on the bottom of the item.

DETAILED DESCRIPTION OF THE PREFERRED EMBODIMENTS

Figure 1:
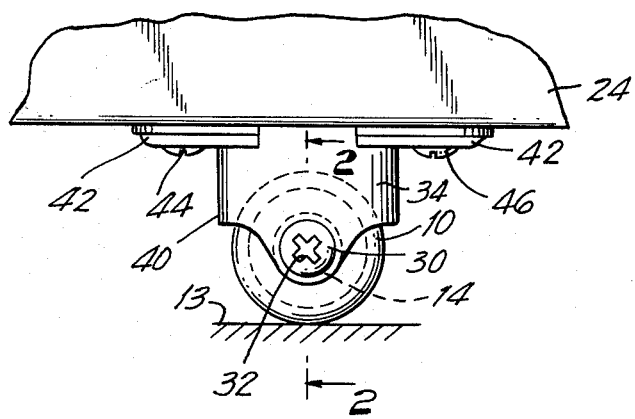
FIG. 1 is an elevation view of one embodiment of the present luggage roller.
Figure 2:
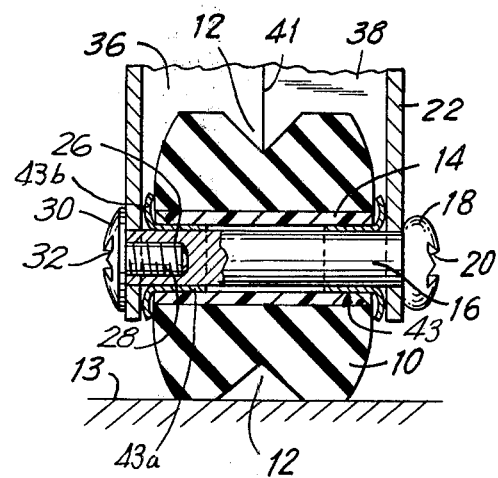
FIG. 2 is a sectional elevation view taken substantially along the line 2—2 of FIG. 1.

Referring now to FIGS. 1 and 2, the present luggage roller is characterized by the provision of a diabolo-shaped wheel 10 (FIG. 2), having an axially central annular V-shaped channel or recess 12 about its cylindrical periphery.

The configuration and dimensions of the roller are important features of the invention. If the roller is too large or too small it is impractical. A roller of excessively large diameter is ungainly and unesthetic; if it is too small in diameter it will jam too easily and cannot roll over obstacles. If it is too narrow it will catch in cracks. Accordingly, the preferred diameter is about 1", but diameters from $\frac{3}{4}$" to $1\frac{1}{2}$" are acceptable. A preferred width is 11/16"; but widths between $\frac{1}{2}$" and 1" are acceptable.

The V-shaped channel should have a width equal to approximately $\frac{1}{3}$ the width of the roller; in the roller shown which is 11/16" wide the width of the mouth of the groove is 9/32". The depth of the channel is about $\frac{1}{3}$ the width of its mouth; in the roller shown the depth of the channel is 3/32". The sides of the roller are chamfered to reduce the widths of the treads at opposite sides of the channel. Any configuration of chamfer can be used; preferably the chamfer is outwardly convex, as illustrated, to provide tread width of about $\frac{1}{2}$ the width of the mouth. In the roller shown the tread widths are $\frac{1}{8}$". The chamfers start radially inwardly from the periphery for a distance slightly greater than the width of the treads, in the roller shown about 5/32".

The wheel 10 rests on a planar surface 13, and is composed of rubber or an elastomeric plastic, e.g. Buna-S, and an integral cylindrical sleeve 14 is coaxially mounted to the wheel, within the central opening in the hub of the wheel. This sleeve 14 is typically composed of a material having a low coefficient of static and kinetic friction such as teflon, polyethylene, polypropylene, especially isotactic polypropylene, nylon or the like plastic, or alternatively of a metal such as brass or steel or the like. Preferably the sleeve is of teflon. Preferably, also, the wheel is molded around the sleeve. The sleeve 14 is rotatably mounted on a metal axle 16, so that the wheel 10 with its integral sleeve 14 is freely rotatable on the axle 16 and about the central longitudinal axis or axis of symmetry of the cylindrical axle. The axle 16 configuration entails the provision of a recessed, e.g., slotted, head 18 having a screw driver slot 20 at one end of the axle 16. The slot either can be single or cross (Phillips) to enable it to be turned by a tool commonly in a person's possession. The slotted head 18 is disposed externally to an associated bracket 22 which connects and holds the axle 16 to a piece of luggage 24. The other end of the axle has a threaded bore 26, and a screw having a threaded shank 28 and a slotted heat 30 (Phillips cross slot 32) screwed into the bore 26. The slotted head 30 is external to an associated bracket 34, which also connects and permanently holds the axle 16 to the piece of luggage 24, in conjunction with the bracket 22.

As best seen in FIG. 2, the brackets 22 and 34 are characterized by the provision of respective and opposed generally perpendicular extensions 36 and 38 along a lateral edge, such as the edge 40 of bracket 34, from which the extensions 36 extends laterally relative to the bracket 34. The opposed extensions 36 and 38 reach towards each other from the respective edges of the brackets and terminate at edges which are contiguous as shown at line 41 (FIG. 2). Thus, a baffling against ingress of discrete material such as pebbles, twigs or leaves between the wheel and the container is provided by the extensions 36 and 38. The brackets 22 and 34 are secured to a mounting plate 42, which is interposed between the brackets and the portable container 24. Typically the plate 42 is secured to the bottom surface of the container 24 by members 44 and 46, which may consist of bolts, rivets, screws or the like.

To prevent rubbing of the sides of the wheels 10 against the brackets 22, 34, with consequent wear of the wheels and frictional drag inhibiting free turning of the wheels, spacers 43 in the form of metal eyelets have their thin shanks 43a inserted into opposite ends of the sleeves 14 and their outturned flanged heads 43b located around the inner portions of the wheels bounding the ends of the sleeves. The heads 43b are outwardly convex to minimize the contact areas with the inner surfaces of the brackets. The eyelets are hardchrome plated to reduce friction and lengthen their useful lives.

When a wheel becomes excessively worn, or cracks, breaks, or develops a flat, it is easy to replace in the field, which may be a country far from home. The owner of the luggage only need a screw driver—a ubiquitous tool—to remove the bad wheel and replace it with a new one, which is small enough to be carried as a spare in the luggage. Also a few extra eyelets can be carried in the luggage to replace worn out old ones. Replacement of wheels and eyelets requires no particular skill or expertise and can be effected in seconds.

Figure 3:
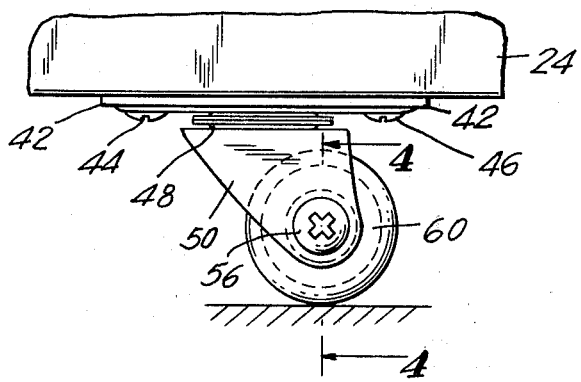
FIG. 3 is an elevation view of an alternative embodiment of the present luggage roller.
Figure 4:
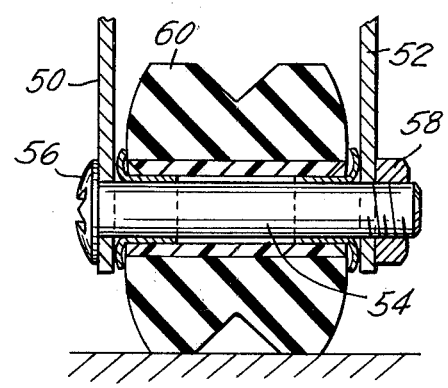
FIG. 4 is a sectional elevation view taken substantially along the line 4—4 of FIG. 3.

FIGS. 3 and 4 show an alternative embodiment of the invention, in which a swivel joint 48 having ball bearings as shown is interposed between the mounting plate 42 and brackets 50 and 52, so that the luggage roller is swivelably mounted to the container 24. As best seen in FIG. 4, the brackets 50 and 52 in this embodiment of the invention are devoid of perpendicular extensions along lateral edges. In addition, a configuration of axle different from that of FIG. 2 is shown in FIG. 4, namely an axle 54 having a slotted head 56 external to its associated bracket 50, and external threading on the other end of the axle 54. A nut 58 is screwed onto the other end of the axle 54, and as shown, the nut 58 is external to the bracket 52 associated with the externally threaded other end of the axle 54.

Figure 5:
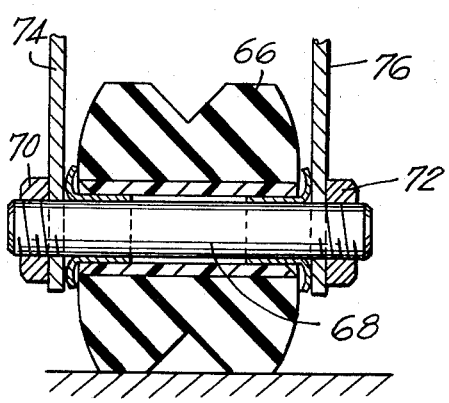
FIG. 5 is comparable to FIG. 4 but shows an alternative aspect of the invention.

FIG. 5 shows an embodiment of the invention in which the wheel 66 has an axle 68 externally threaded at both ends, with respective nuts 70 and 72 being screwed onto the ends of the axle, the nuts external to their respective associated brackets 74 and 76.

FIG. 6 shows an alternative embodiment of axle in which the axle 78 is a split axle having two opposed portions 80 and 82. Each portion 80 and 82 has a respective outer terminal slotted head 84 and 86. The inner end of portion 80 has a threaded stub shaft 90 screwed into a bore 88, as shown.

FIGS. 7 and 8 illustrate the typical orientation and arrangement of a plurality of the present luggage rollers mounted on the bottom surface of a piece of lugggage 92 having a handle 94 and two opposed body portions 96 and 98 connected by hinges 100 and 102. As shown in FIG. 7, each pair of opposed luggage rollers, such as 104 and 106, is mounted to the bottom surface of the piece of luggage 92, with the diabolo-shaped wheels 108 and 110 being coaxially oriented in registration along axis 112. As shown, each wheel 108 and 110 is mounted adjacent an outer edge of the bottom portion of its respective luggage portion, i.e. wheel 108 is mounted adjacent to edge 114 of portion 96, and wheel 110 is mounted adjacent to edge 116 of portion 98.

It thus will be seen that there is provided a luggage roller which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent;

1. Identical luggage rollers for attachment to a piece of luggage in opposed transversely aligned pairs each adjacent to a different one of a pair of spaced sides of the luggage, each roller constituting a wheel of elastomeric material molded around an axially central sleeve of a material having a low coefficient of static and kinetic friction, a metal axle extending through said sleeve and projecting outwardly from both sides of said sleeve, said sleeve together with said wheel being rotatable about said axle, a bracket supporting the opposite ends of said axle, said bracket being fixedly connectable to said luggage, heads on opposite ends of the axle, at least one head being slotted to receive a screwdriver, said at least one head being detachably screw-connected to the axle, whereby when a wheel becomes defective it can be removed and replaced with a new one in the field with the use of a screwdriver, said wheel being in the configurations of a diabolo formed by the provision of an axially centered annular V-shaped wide-mouthed deep channel, the diameter of the wheel being from $\frac{3}{4}''$ to $1\frac{1}{2}''$, the width of the wheel being from $\frac{1}{2}''$ to $1''$, the mouth of the channel being having a width of approximately $\frac{1}{3}$ the width of the wheel, the depth of the channel being about $\frac{1}{3}$ the width of the mouth, the sides of the roller being chamfered to provide a tread width of about $\frac{1}{3}$ the width of the mouth.

2. Rollers as set forth in claim 1 wherein metal eyelets are provided at opposite sides of each wheel, each eyelet having a thin shank inserted into a different end of a sleeve between the sleeve and the axle, each eyelet having a flanged head interposed between a side of the wheel and the bracket to prevent the wheel from rubbing against the bracket.

3. Rollers as set forth in claim 2 wherein the flanged heads of the eyelets are externally convex to minimize the areas of contact between the heads and the brackets.

4. Rollers as set forth in claim 3 wherein the eyelets are hard-chrome plated to reduce friction and lengthen their useful lives.

5. Rollers as set forth in claim 1 wherein the other head is slotted to receive a screwdriver.

6. Rollers as set forth in claim 1 wherein the chamfer is outwardly convex.

* * * * *